Jan. 19, 1960     M. SOLOMON     2,921,347
KNOCKDOWN STRUCTURE
Filed Feb. 20, 1957     2 Sheets-Sheet 2
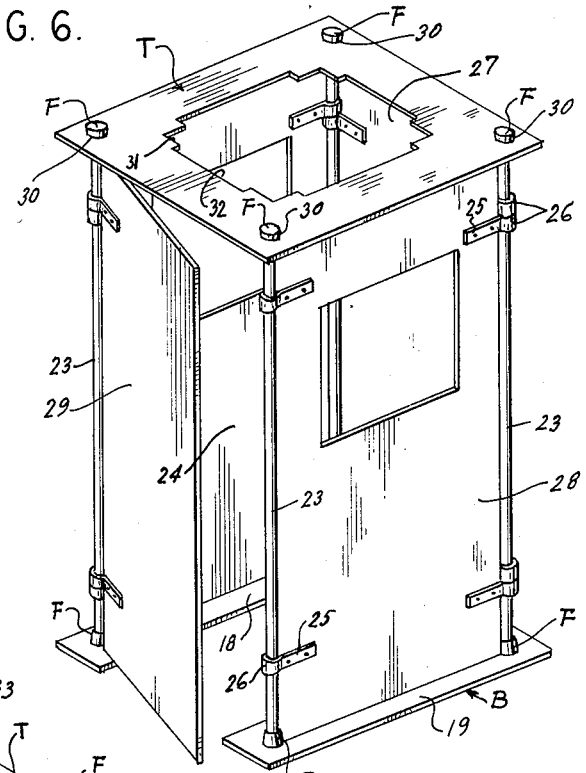
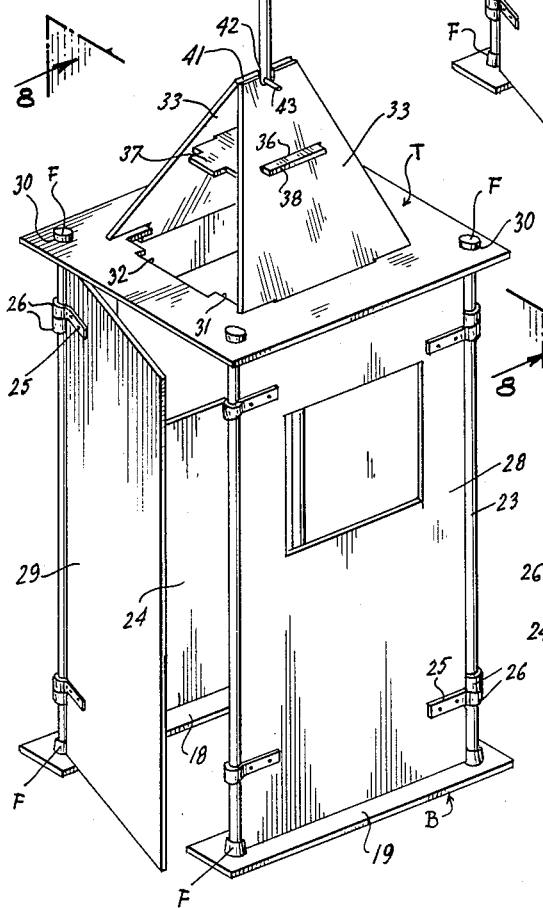
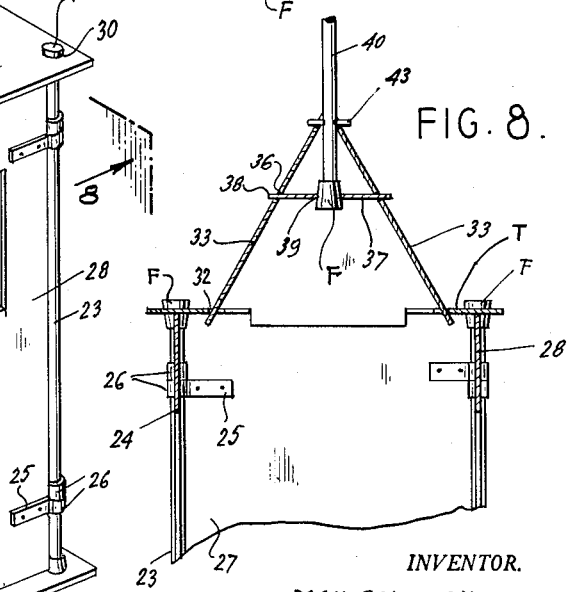
INVENTOR.
MAX SOLOMON
BY
Mocks Blum
ATTORNEYS

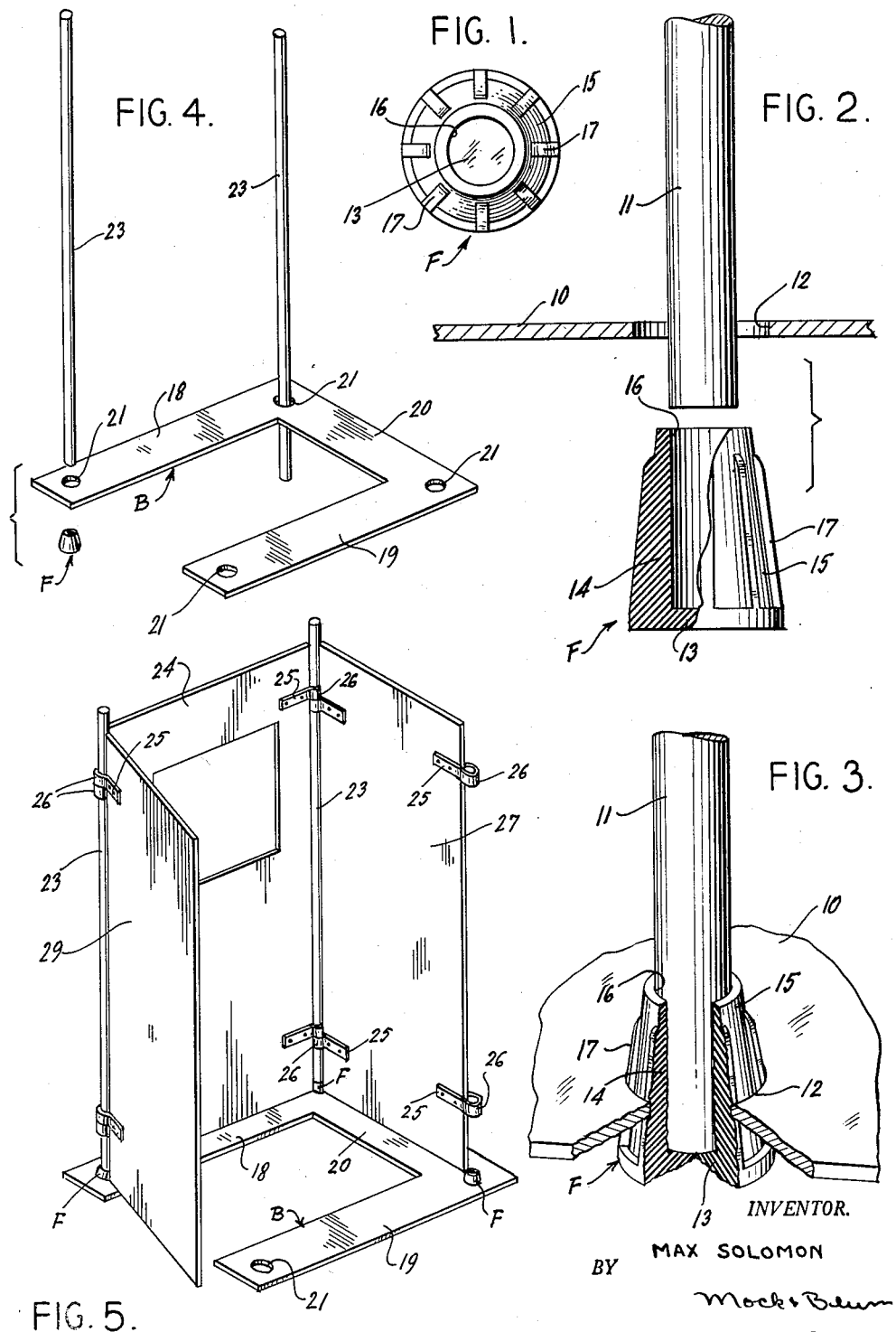

United States Patent Office 2,921,347
Patented Jan. 19, 1960

2,921,347

KNOCKDOWN STRUCTURE

Max Solomon, Brooklyn, N.Y., assignor to Lansky Die Cutting Corp., New York, N.Y., a corporation of New York Application February 20, 1957, Serial No. 641,421

5 Claims. (Cl. 20—2)

The present invention relates to a structural joint and is concerned primarily with a novel joint intended to be used in knockdown structures such as toys, display stands, advertising set-ups, and similar constructions.

At the present time there are various types of knockdown structures which must be erected and knocked down from time to time. In such a structure, the joint which establishes the assembled relations between the various parts is the very heart of the structure. If this joint is sound and secure and capable of withstanding shocks and vibrations, the structure will ordinarily meet any particular conditions of usage. Moreover, the joint should be susceptible of easy assembly and disassembly. On the other hand, if the joint is difficult to assemble and is easily destroyed, it will not prove satisfactory to the users.

With the foregoing conditions in mind, the present invention has in view as an important objective the provision, in a knock-down structure, of a joint which comprises a generally plate-like member formed with a circular opening, an elongate member that is loosely received in said opening, and a resilient ferrule having an outer tapered surface which engages the opening in the member and having a socket which snugly receives one end of the elongate member. With the socket receiving the end of the elongate member, the ferrule may be forced into the opening in the plate-like member under pressure, whereupon the resilient property of the ferrule, coupled with the wedging action of the tapered surface, achieves a secure joint which is not only easily assembled but which is capable of withstanding shocks and vibrations due to the resilient nature of the ferrule.

Still another object of the invention is to provide, in a structural joint of the character aforesaid, a ferrule having properties of resiliency and elasticity as above noted, and the outer tapered surface of which is provided with longitudinally extending ribs. Such ribs are susceptible of being deformed when the ferrule is forced into place and result in an improved holding effect.

While it might be possible and entirely practical to employ a ferrule that is open at both ends, the invention has as a further object the provision, in a structural joint of the type indicated, a ferrule having a socket which is closed at one end. This closed end limits inward movement of the elongate member relative thereto and also provides a good base-engaging surface, which is important under certain conditions of usage.

Still another object of the invention is to provide, in a knockdown structure of the character aforesaid, a joint of the type described in which the opening is circular, the elongate member is cylindrical, and the ferrule has a cylindrical socket and an outer conical surface.

Various other more detailed objects and advantages of the invention, such as arise in connection with carrying out the above-noted ideas in a practical embodiment, will in part become apparent and in part be hereinafter stated as the description of the invention proceeds.

The invention therefore comprises a joint for knockdown structures which consists essentially of a member formed with an opening, an elongate member having one end loosely received in said opening, and a ferrule having properties of resiliency and elasticity fitted over one end of said elongate member and having an outer tapered surface that is wedged into said opening. This tapered surface may be provided with outwardly protruding longitudinal ribs; and the ferrule has a closed socket receiving the end of the elongate member.

For a full and more complete understanding of the invention, reference may be had to the following description and accompanying drawings, wherein:

Figure 1 is a top plan view of a resilient ferrule that is intended to be used in the joint of this invention;

Figure 2 is a side view, partly in section and partly in elevation, of the several elements of the joint in exploded relation;

Figure 3 is a detailed perspective, with parts broken away and shown in section, of the assembled joint;

Figure 4 is another perspective showing the manner of assembling the elements of a knockdown structure;

Figure 5 is another perspective showing the knockdown structure including the joints of this invention as further completed;

Figure 6 is still another perspective showing a more completed stage in the erection of a knockdown structure including the joints of this invention;

Figure 7 is a perspective of the completed structure of Fig. 6; and

Figure 8 is a detailed vertical section of the upper portion of the structure shown in Figure 7 and is taken about on the plane 8—8 of Figure 7.

Before referring to the drawing, it will be understood that the joint of this invention may be employed with many types of knockdown structures. Purely for purposes of illustration, the drawings illustrate one type of toy house which may be easily erected and disassembled as occasion demands due to the novel joint of this invention.

Referring now to the drawings, and first more particularly to Figure 2, the joint of this invention is shown as effecting the connection between a member 10 which, for the purposes of this specification, will be identified as as plate-like or flat member, and an elongate member 11 which, as illustrated in the drawing, is cylindrical. Obviously, this elongate member 11 may be solid or tubular as occasion demands. The flat member 10 is formed with an opening 12 which is circular to conform to the shape of the cylindrical member 11 and which has a radius considerably in excess of that of the cylindrical member 11. Obviously, if the elongate member 11 has a cross section other than the circular form illustrated, the opening 12 will have a corresponding shape.

A ferrule is referred to in its entirety by the reference character F. It comprises a flat bottom wall 13 from the outer periphery of which upstands a circular wall 14 having an outer conical surface 15 and an inner cylindrical surface 16 that is dimensioned to snugly receive the cylindrical member 11. Protruding outwardly from the conical surface 15 are a plurality of longitudinally extending ribs 17.

The ferrule F may be made from any material having the required properties of resiliency and elasticity, although the invention has particularly in mind the use of rubber or an appropriate rubber composition.

Upon referring to Figure 3, it will be seen that, with one end of the cylindrical member 11 snugly received in the socket defined by the cylindrical surface 16 and end wall 13, the ferrule F may be forced into the opening 12 and the conical formation will result in a wedging action which effects a compression of the material of the ferrule F so that the latter may be firmly wedge in place.

Referring now more particularly to Figures 4-8, inclusive, a knockdown toy house which includes the joint illustrated in Figures 2 and 3 will be described. A base B of U-shaped formation defined by sides 18, 19, and a back 20 is formed with circular openings 21 at each of its four corners. These openings 21 correspond to the opening 12 in Figures 2 and 3. A pair of dowel pins 23 are now assembled in an erect position from the openings at the opposite ends of the side 18, two of the ferrules F being employed for this purpose.

A side-wall panel 24 carries four strap members on its inner face which are in the nature of hinge elements. Thus each strap member 25 terminates in a loop 26 that is adapted to receive one of the dowels 23. The same is true of a back member 27, and a second side member 28. A front-door member 29 is similar to the side and back members but has only two straps 25. It is evident that, with the dowels 23 in an erect position, the rear panel 27, side panel 24, and front panel 29 may be assembled thereon in the manner depicted in Figure 5. Thus the loops 26 of each strap 25 are simply fitted over the respective dowels.

With the panels 24, 27, and 29 in the position shown in Figure 5, the side panel 28 may be properly positioned so that the loops 26 thereon are in alignment with the loops 26 of the rear panel 27; whereupon an additional dowel may be passed through the aligned loops and a final dowel through the loops at the free edge of the panel 28. The lower ends of these dowels are anchored to the base member B by using the ferrules F.

A top member T of rectangular formation corresponding to that of the base B is formed with an opening 30 at each of its corners. The upper ends of the dowels 23 are now secured in these openings by using additional ferrules F.

The top member T is formed with a rectangularly shaped opening defined by four sides 31, each of which is recessed or indented as shown at 32. Steeple elements 33 of trapezoidal shape have base edges at 34 formed with extensions at 35. These extensions at 35 are received in the recesses 32, with the end portions of each side edge overlying and engaging the upper face of the top T.

The steeple elements 33 are formed with slots at 36; and a flagpole anchorage 37 has tongues 38 extending through these slots. The flagpole anchorage 37 is formed with an opening at 39 which is received in the lower end of a flagpole 40. A ferrule F secures the anchorage of the lower end of the flagpole 40 to the member 37.

The upper edges 41 of the steeple sides 33 are notched as shown at 42 to accommodate the flagpole; and a cross pin 43 carried by the flagpole engages the bottom of the notches and serves to support the flagpole in its erected position.

It is evident that each of the joints involving the ferrule F may be easily established or disassembled as occasion demands. Moreover, the joint is firm and secure and is capable of withstanding shocks and vibrations. It is further noted that by using the cylindrically shaped dowel pins as the elongate members it is possible to provide swinging action on the parts of such elements as the door 29.

While a preferred specific embodiment of the invention is hereinbefore set forth, it is to be clearly understood that the invention is not to be limited to the exact materials, constructions, and designs illustrated and described, because various modifications of these details may be provided in putting the invention into practice within the purview of the appended claims.

What is claimed is:

1. In a knockdown structure, a joint comprising a structural member formed with an opening, an elongate member having one end smaller than said opening and received therein, and a resilient ferrule having a socket receiving the said end of said elongate member and an outer tapered surface including longitudinally extending ribs engaging the edge of said opening with a wedging action.

2. In a knockdown structure, a joint comprising a structural member formed with an opening, an elongate member having one end smaller than said opening and received therein, and a rubber ferrule having a socket receiving the said end of said elongate member and an outer tapered surface engaging the edge of said opening with a wedging action, said ferrule having longitudinally extending ribs on said tapered surface.

3. In a knockdown structure, a joint comprising a structural member formed with an opening, an elongate member having one end smaller than said opening and received therein, and a resilient ferrule having a flat end wall and an annular wall upstanding from the periphery thereof, said annular wall having an inner surface cooperating with said end wall to define a socket receiving said end of said elongate member and an outer tapered surface engaging the edge of said opening, and longitudinal ribs on said tapered surface.

4. In a knockdown structure, a joint comprising a flat structural member formed with a circular opening, a cylindrical elongate member having one end smaller than said opening and received therein, and a resilient ferrule having a cylindrical socket receiving said end of said elongate member and an outer conical wall engaging the edge of said opening with a wedging action, and longitudinal ribs on said conical surface that are subject to deformation by said wedging action.

5. In a knockdown structure, a base member having a plurality of openings therein, rubber ferrules, a corresponding number of dowels having their lower ends anchored in said openings by said rubber ferrules, said ferrules each having a socket in which the lower end of its respective dowel is received and an outer tapered longitudinally ribbed surface wedgingly engageable in a corresponding one of said openings, a plurality of wall panels each having straps formed with loops receiving said dowels whereby said wall panels are held in an erected position, and a top member having openings corresponding in number and arrangement to said openings in said base member with the upper ends of said dowels anchored therein by rubber ferrules.

References Cited in the file of this patent
UNITED STATES PATENTS

| | | |
|---|---|---|
| 2,057,942 | Fay | Oct. 20, 1936 |
| 2,223,153 | Seifer | Nov. 26, 1940 |
| 2,523,508 | Ledgett | Sept. 26, 1950 |
| 2,765,580 | Herrschaft | Oct. 9, 1956 |